United States Patent [19]

Yuto et al.

[11] Patent Number: 4,458,986

[45] Date of Patent: Jul. 10, 1984

[54] COATED PLASTIC OPTICAL FIBER

[75] Inventors: Masao Yuto; Yuji Kameo, both of Kanagawa, Japan

[73] Assignee: Sumitomo Electric Industries, Ltd., Osaka, Japan

[21] Appl. No.: 313,403

[22] Filed: Oct. 21, 1981

[30] Foreign Application Priority Data

Oct. 24, 1980 [JP] Japan .................... 55-150984

[51] Int. Cl.$^3$ .............................................. G02B 5/172
[52] U.S. Cl. ............................ 350/96.33; 350/96.23; 350/96.34
[58] Field of Search ............... 350/96.29, 96.30, 96.31, 350/96.33, 96.34, 96.23; 427/163

[56] References Cited

U.S. PATENT DOCUMENTS

| | | | |
|---|---|---|---|
| 3,930,103 | 12/1975 | Chimura et al. | 350/96.34 X |
| 3,980,390 | 9/1976 | Yamamoto et al. | 350/96.34 X |
| 3,999,834 | 12/1976 | Ohtomo et al. | 350/96.34 |
| 4,105,284 | 8/1978 | Olshansky | 350/96.33 |
| 4,147,407 | 4/1979 | Eichenbaum et al. | 350/96.34 |

OTHER PUBLICATIONS

Oikawa et al., "Plastic Optical Fibre With Improved Transmittance," *Electron. Lett.,* vol. 15, No. 25, Dec. 1979, pp. 829–830.

*Primary Examiner*—John D. Lee
*Attorney, Agent, or Firm*—Sughrue, Mion, Zinn, Macpeak and Seas

[57] ABSTRACT

A plastic fiber or an assembly thereof provided with first and second layers. The plastic fiber includes a core portion and a clad portion having lower refractive index than that of the core portion. The fiber is provided with the first coating formed over said clad portion. The first coating is formed of a saponification product of ethylene-vinyl acetate (EVA) copolymer, and the second coating is formed over said first coating and is made of a thermoplastic resin.

6 Claims, 10 Drawing Figures

COATED PLASTIC OPTICAL FIBER

BACKGROUND OF THE INVENTION

While an optical fiber having a core portion and a clad layer each made of plastic substance has poorer transmission property than an optical fiber made of glass, it excels the optical fiber of glass in respect that it endures curvatures without breakage to a smaller minimum radius, has greater impact strength, and warrants greater ease of handling. Further, because the plastic optical fiber offers a greater difference in refractive index between the core portion and the clad layer, it possesses high bonding efficiency at connector portions thereof and thus the processing of its terminal portions is simplified. Owing to these advantages, the plastic fiber can be effectively utilized in a data transmission system at a short distance of not more than several tens of meters. However, the plastic fiber provides drawbacks in that it is easily suffered by an organic solvent, and it does not provide thermal resistance at a temperature of about 80° C. or more, so that the plastic fiber undertakes several restrictions in practical use.

Efforts have been made to date, therefore, to enhance durability of the plastic fiber by applying various kinds of coatings on the outer peripheral surface thereof. However, such coatings inadvertantly affect initial characteristics of the plastic fiber. Therefore, it was difficult to enhance durability of the plastic fiber by the coating layer, simultaneously maintaining the inherent properties of the plastic fiber. For example, virtually, conventional coatings for the plastic fibers available on the market are a low-density PE contained carbon (FIGS. 1 and 2). Although such a coated plastic fiber shows slightly better durability against solvents than an uncoated one, the initial characteristic of transmission loss of the coated plastic fiber is worse than that of the uncoated plastic fiber. A plastic fiber coated with PVC (FIG. 3) has been proposed to enhance flame retardancy in addition to the durability against solvents. In this type of coating, however, even though anti-flamability is improved, but such type of plastic fiber is more susceptible to the action of organic or inorganic solvents. It has another problem that a plasticizer in the PVC layer moves into the fiber and deteriorates the properties of the fiber. When PVC capable of preventing such moving of the plasticizer is used, the deterioration due to the plasticizer no longer exists, but the deterioration of the properties still persists due to an external solvent.

SUMMARY OF THE INVENTION

This invention aims to solve the problem mentioned above and, at the same time, to enhance the durability of the plastic fiber, by first covering the surface of the plastic fiber with a coat of a saponification product of EVA and subsequently applying to that coat a thermoplastic resin. Specifically, this invention relates to a single transparent plastic fiber or assembly thereof having a core portion and a clad layer each made of plastic substance, the core portion having a higher refractive index than the clad layer, which plastic fiber is characterized by having a saponification product of ethylene-vinyl acetate copolymer (EVA) directly applied to the surface of the plastic fiber and further characterized by an outermost coating made of a thermoplastic resin such as polyethylene (PE) polyurethane, and polyvinylchloride (PVC).

DETAILED DESCRIPTION OF THE PREFERRED EMBODIMENTS

Now, the present invention will be described in detail below with reference to the embodiments thereof illustrated in the accompanying drawings.

Figure 6:
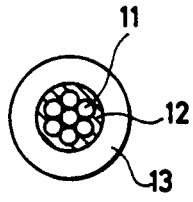
FIGS. 6 and 7 are schematic diagrams illustrating constructions of assembly of fibers according to the present invention.

The basic construction of the present invention comprises a single plastic fiber 10 or an assembly of such plastic fibers 11, a coat of a saponification product of EVA 12 directly applied to the surface of the single plastic fiber or the assembly, and an overcoat of thermoplastic resin 13 such as polyethylene (PE), polyurethane and polyvinylchloride (PVC) applied to the aforementioned coat 12. (See FIG. 4 and FIG. 6.) Polystyrene (PS) and other plastics as well as PMMA can be used for the plastic fiber.

Figure 5:
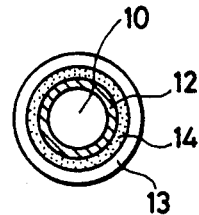
Figure 7:
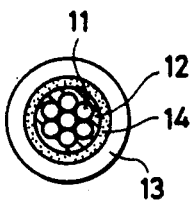

Particularly, concerning the solvent-resistivity, it is effective to employ saponificated EVA having the original VA content of 50 wt% or more in EVA before saponification. Further, it is effective to provide an intermediate layer 14 as shown in FIGS. 5 and 7 between the layer 12 of the saponification product of EVA and the outer coating layer 13 in order to provide tensile strength of the fiber coating along longitudinal direction of the fiber and to protect the same against external side pressure. When employing such fiber in a building or vehicle, it is necessary to greatly consider the solvent-resistivity and flame-resistivity. In this case, saponificated product of EVA having VA content of 50 wt% or more and PVC, flame-retardant polyethylene or flame-retardant polyurethane are preferably used for the layers 12 and 13, respectively.

Figure 8:
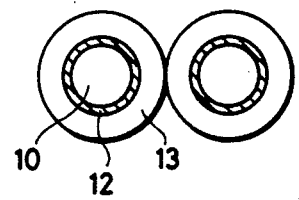
FIGS. 8 and 9 are schematic diagrams illustrating construction of two adjoined fibers according to the present invention.
Figure 9:
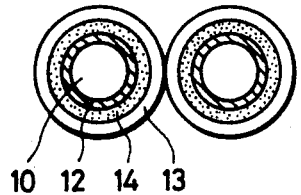
Figure 10:
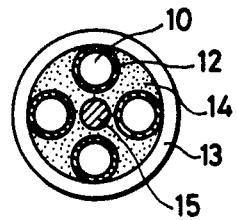
FIG. 10 is a schematic diagram showing the construction of fiber assembly which incorporates a tension member.

FIGS. 8 and 9 show modified structures of the embodiment of the present invention, wherein two cores are proposed. In FIG. 10, as another modification, a tension member 15 made of FRP or steel wire is centrally provided.

The afroementioned saponification product of EVA has a polar hydroxyl group and, therefore, offers strong resistance to non-polar oils. For example, its oil absorbing rate is about one tenth that of nylon-6, which is well known as an oil-resistant resin. Thus the saponification product has markedly high oil resistance.

The same is true with respect to organic solvent-resistivity. For example, the saponification product of EVA provides equilbrium swellabilities against acetone and benzene of 1/6 and 1/60, respectively, as higher than that of polyethylene which is considered to provide relatively excellent organic-solvent resistivity and therefore it is apparent that the saponification product of EVA exhibits desirable characteristic.

The degree of oil-resistivity and organic solvent-resistivity depends upon the amount of hydroxyl group (vinyl alcohol group) in the saponification product of EVA determines. With the saponification treatment of EVA, saponification degree becomes 99% or more, so that VA content in the original EVA is determinative to these properties. Accordingly, it is most preferable to use saponificated product of EVA having VA content of at least 50 wt% for the layer 12 in order to enhance these properties in the form of this layer.

The thickness of the coating of the saponification product of EVA depends on a diameter of the fiber. Where the outer diameter of a single fiber is 0.5 mm, the thickness of the coating is within the range of 0.01 mm to 0.20 mm, preferably, 0.03 mm to 0.15 mm. The lower limit of the thickness is determined in light of solvent-resistivity, whereas the upper limit is determined in view of flexibility and stability of transmission loss.

Now, working examples of the present invention will be described. Plastic fibers of the constructions of FIG. 4 and FIG. 5 were tested for resistance to solvents, transmission property at elevated temperatures, breaking strength, and flame retardancy. The fiber was a wholly plastic fiber 0.5 mm in diameter, and it was covered with a coat of the saponification product of EVA having VA content of 55 wt% and 0.1 mm in thickness. The overcoat was made of ordinary PVC and had an outside diameter of 1.1 mm. In the fiber construction of FIG. 5, the intermediate layer was formed of an aramid fiber (KEVLAR ®49). For the purpose of comparison, conventional cables of the constructions of FIG. 1 and FIG. 3 and a single plastic fiber (bare fiber) 0.5 mm in diameter were subjected to the same test. The overcoat of LDPE in the cable of FIG. 1 contained carbon. The overcoat of PVC in the cable of FIG. 3 used the same PVC as used in the fibers of this invention illustrated in FIG. 4 and FIG. 5.

Figure 1:
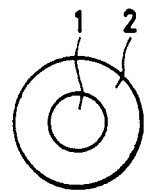
FIGS. 1 to 3 are schematic diagrams illustrating the constructions of conventional fiber coatings.
Figure 2:
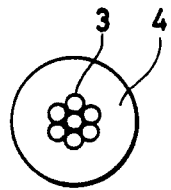
Figure 4:
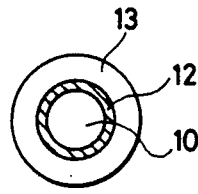
FIGS. 4 and 5 are schematic diagrams illustrating constructions of single fiber according to the present invention.

Further, another experiment has been conducted by testing the optical fiber having the structure shown in FIG. 4, in which the same LDPE as that employed in FIG. 1 was coated as the overcoat.

The results obtained are shown in Table 1. The test for transmission property was measured using LED (light emitting diode) having wavelength of 0.66 μm. The break strength was tested by Tensilon Universal Tensile Strength Tester. As is clearly seen from Table 1, the plastic fibers according to the present invention provide excellent solvent-resistivity and excellent properties at high temperature.

TABLE 1

Figure 3:
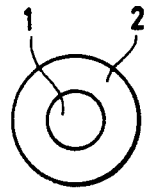

| | Sample | | | | | |
|---|---|---|---|---|---|---|
| | This invention | | | Comparative Examples | | |
| Test | Sample of FIG. 4 PE coating | Same structure of FIG. 4 PVC coating | Same structure of FIG. 5 PVC coating | Same structure of FIG. 1 PE coating | Bare fiber | Same structure of FIG. 3 PVC coating |
| Transmission loss (dB/m) Resistance to solvent | | | | | | |
| No solvent immersion | 0.47 | 0.46 | 0.45 | 0.60 | 0.45 | 0.46 |
| Gasoline (23° C. × 7 days) | 0.47 | 0.46 | 0.45 | 0.66 | 0.51 | 0.46 |
| Engine oil (50° C. × 7 days) | 0.47 | 0.46 | 0.45 | 0.65 | 0.48 | 0.53 |
| 1N H₂SO₄ (50° C. × 7 days) | 0.48 | 0.46 | 0.45 | 0.61 | 0.50 | 0.49 |
| Brake Oil (50° C. × 7 days) | 0.47 | 0.46 | 0.46 | 2.73 | *Note 1 | *Note 1 |
| Degradation at elevated temperature | | | | | | |
| Control No heat application | 0.48 | 0.46 | 0.46 | 0.58 | 0.45 | 0.47 |
| 80° C. × 7 days | 0.53 | 0.50 | 0.51 | 0.77 | 0.51 | 0.85 |
| 80° C. × 14 days | 0.53 | 0.51 | 0.52 | 0.88 | 0.54 | 1.11 |
| 90° C. × 7 days | 0.71 | 0.66 | 0.50 | 1.60 | 0.80 | — |
| Break strength (kg) (maximum load at fiber breakage) | 4.8 | 4.9 | 2.5 | 3.1 | 2.3 | 2.9 |
| Flame retardancy (Flame resistivity) | flamable | not easily flamable | not easily flamable | flamable | flamable | not easily flamable |

Note 1: The fiber was swelled so that the light which dimply passed the fiber could not be sensed by the detector.

The plastic fiber of the present invention, therefore, is particularly useful for data communication within plants or signal transmission within the vehicles such as automobiles.

What is claimed is:

1. A coated single optical plastic fiber or assembly thereof having a core portion and a clad portion formed of plastic substance, said core portion having a higher refractive index than that of said clad portion, characterized in that the surface of said plastic fiber is directly coated with a coating of a saponification product of etylene-vinyl acetate copolymer, and a thermoplastic resin is coated over said coating as an outermost layer.

2. A plastic fiber or assembly thereof according to claim 1, wherein said saponification product of ethylene-vinyl acetate (EVA) copolymer is induced EVA having a vinyl acetate (VA) content of 50 wt% or more.

3. A plastic fiber or assembly thereof according to claim 2, further comprising an intermediate layer provided between the coating of said saponification product of EVA and said thermoplastic outermost layer.

4. A plastic fiber or assembly thereof according to claim 2, wherein said thermoplastic outermost layer is a flame-retardant resin selected from the group consisting of flame-resistant polyethylene, polyvinylchloride (PVC) and flame-resistant polyurethane.

5. A plastic fiber or assembly thereof according to claim 2, wherein two of said plastic fibers are assembled to provide two-core fibers.

6. A plastic fiber or assembly thereof according to claim 2, wherein a plurality of said plastic fibers are assembled and a tension member is centrally disposed within said fiber assembly.

* * * * *